US012580416B2

(12) United States Patent
Liao

(10) Patent No.: US 12,580,416 B2
(45) Date of Patent: Mar. 17, 2026

(54) CHARGING BASE

(71) Applicant: GUANGDONG GOPOD GROUP HOLDING CO., LTD, Guangdong (CN)

(72) Inventor: Zhuowen Liao, Guangdong (CN)

(73) Assignee: GUANGDONG GOPOD GROUP HOLDING CO., LTD, Shenzhen (CN)

( * ) Notice: Subject to any disclaimer, the term of this patent is extended or adjusted under 35 U.S.C. 154(b) by 828 days.

(21) Appl. No.: 17/794,614

(22) PCT Filed: Dec. 14, 2020

(86) PCT No.: PCT/CN2020/136166
§ 371 (c)(1),
(2) Date: Jul. 21, 2022

(87) PCT Pub. No.: WO2021/232764
PCT Pub. Date: Nov. 25, 2021

(65) Prior Publication Data
US 2023/0069686 A1      Mar. 2, 2023

(30) Foreign Application Priority Data

May 18, 2020      (CN) .......................... 202020834843.2

(51) Int. Cl.
*H02J 50/00* (2016.01)
*H02J 7/00* (2006.01)
*H02J 50/10* (2016.01)

(52) U.S. Cl.
CPC ............ *H02J 50/005* (2020.01); *H02J 50/10* (2016.02)

(58) Field of Classification Search
CPC .................................................. H02J 50/005
(Continued)

(56) References Cited

U.S. PATENT DOCUMENTS

2012/0169276 A1* 7/2012 Wang ..................... H02J 50/402
                                                                    320/108
2015/0326053 A1* 11/2015 Amano ................... H02J 50/10
                                                                    320/108
2018/0358826 A1* 12/2018 Allen .................... H02J 7/0044

FOREIGN PATENT DOCUMENTS

CN          208605862 U  *  3/2019  ............... H02J 7/00
CN          209434927 U      9/2019

OTHER PUBLICATIONS

International Search Report of PCT Patent Application No. PCT/CN2020/136166 issued on Mar. 19, 2021.

* cited by examiner

*Primary Examiner* — Ahmed H Omar

(57)      ABSTRACT

A charging base includes a charging mechanism, a first supporting mechanism and a second supporting mechanism. The charging mechanism includes a bottom housing and a charging main body. The first supporting mechanism includes a first supporting plate and a first charging coil. The first supporting plate includes a rotation portion rotatably connected to the bottom housing and an extension portion connected to the rotation portion, and a level of the extension portion when the first supporting plate is in a first supporting position is higher than that of the extension portion when the first supporting plate is in a first storage position; and the second supporting mechanism includes a second supporting plate rotatably connected to the bottom housing, the second supporting plate being capable of limiting a displacement of an electronic device that abuts against the first supporting plate when the second supporting plate is in a second supporting position.

14 Claims, 6 Drawing Sheets

(58) Field of Classification Search

USPC .......................................................... 320/108

See application file for complete search history.

CHARGING BASE

TECHNICAL FIELD

The present application belongs to the technical field of charging devices, and particularly relates to a charging base.

BACKGROUND ART

With the continuous development of electronic devices such as mobile phones and tablet computers, the electronic devices are more widely used in people's lives. In addition, the level of intelligence of the electronic devices is getting higher and application occasions thereof are more extensive at present, resulting in more power consumption of the electronic devices such as mobile phones. Therefore, how to charge the electronic devices has become a problem that people have to face. During use of a common wireless charger on the market, an electronic device such as a mobile phone needs to be placed flat on the charger, which is inconvenient for a user to view the displayed content. Moreover, when placed flat, the electronic device is easy to deviate from a charging position and difficult to be positioned.

SUMMARY OF THE INVENTION

Technical Problem

An objective of the present application is to provide a charging base, which is intended to solve the technical problem in the prior art of an electronic device being inconvenient to be viewed and easy to deviate from a charging position when placed flat for charging.

Solutions to the Problem

Technical Solutions

An objective of the present application is to provide a charging base, which is intended to solve the technical problem in the prior art of an electronic device being inconvenient to be viewed and easy to deviate from a charging position when placed flat for charging.

The present application is implemented by a charging base for charging an electronic device, the charging base comprising:

a charging mechanism, comprising a bottom housing and a charging main body which is connected to the bottom housing and configured to supply power;

a first supporting mechanism, comprising a first supporting plate which is rotatably connected to the bottom housing and configured to allow the electronic device to abut against, and a first charging coil which is arranged on the first supporting plate and electrically connected to the charging main body, wherein the first charging coil is capable of wirelessly charging the electronic device that abuts against the first supporting plate, the first supporting plate comprises a rotation portion and an extension portion connected to the rotation portion, the rotation portion is rotatably connected to the bottom housing, the first supporting plate is rotatable between a first storage position and a first supporting position, and a level of the extension portion when the first supporting plate is in the first supporting position is higher than that of the extension portion when the first supporting plate is in the first storage position; and a second supporting mechanism, comprising a second supporting plate configured to hold the electronic device, wherein the second supporting plate is rotatably connected to the bottom housing and is rotatable between a second storage position and a second supporting position, and the second supporting plate is capable of limiting a displacement of the electronic device that abuts against the first supporting plate when the first supporting mechanism is in the first supporting position and the second supporting mechanism is in the second supporting position.

In one of the embodiments, the first supporting mechanism further comprises a damping shaft connected to the bottom housing, the rotation portion is rotatably connected to the damping shaft and capable of being limited by a damping force between itself and the damping shaft, and a central axis of the damping shaft is parallel to a rotation axis of the second supporting plate.

In one of the embodiments, the bottom housing comprises an upper housing body and a lower housing body joined with the upper housing body, an arc-shaped abutment surface is provided on the side of the upper housing body facing away from the lower housing body, a central axis corresponding to the arc-shaped abutment surface coincides with the central axis of the damping shaft, and the rotation portion is adapted to the arc-shaped abutment surface and abuts against the arc-shaped abutment surface.

In one of the embodiments, the rotation portion is provided with a limiting groove adapted to the damping shaft, the first supporting mechanism further comprises a first limiting member connected to the rotation portion, the first limiting member and a wall of the limiting groove together enclose a first rotation space, and the damping shaft passes through the first rotation space.

In one of the embodiments, the bottom housing is provided with a pivot shaft, the second supporting mechanism further comprises a second limiting member connected to the second supporting plate, the second supporting plate and the second limiting member together enclose a second rotation space, and the pivot shaft passes through the second rotation space, so that the second supporting plate is rotated relative to the pivot shaft.

In one of the embodiments, the level of the extension portion is higher than that of the rotation portion when the first supporting plate is in the first storage position.

In one of the embodiments, the second supporting plate comprises a raising portion, a lowering portion, and a connecting portion connected between the raising portion and the lowering portion, the connecting portion is rotatably connected to the bottom housing, and a level of the raising portion is higher than that of the lowering portion when the second supporting plate is in the second supporting position.

In one of the embodiments the level of the raising portion is equal to that of the lowering portion when the second supporting plate is in the second storage position.

In one of the embodiments, when the first supporting plate is in the first storage position and the second supporting mechanism is in the second storage position, the first supporting mechanism and the second supporting mechanism are located on the same horizontal plane.

In one of the embodiments, the second supporting mechanism further comprises a protruding post which protrudes from the lowering portion, and the first supporting mechanism further comprises a force applying member connected to the rotation portion, the force applying member being capable of pushing the protruding post such that the second limiting plate is rotated from the second storage position to the second supporting position as the first supporting plate is rotated from the first storage position to the first supporting position.

In one of the embodiments, the charging base further comprises a reset mechanism connected to the bottom housing, which reset mechanism is capable of applying an elastic force to the second supporting plate when the second supporting plate is in the second supporting position, such that the second supporting plate is reset to the second storage position.

In one of the embodiments, the reset mechanism is elastic, the lowering portion abuts against the reset mechanism, and the reset mechanism is capable of applying an upward elastic force to the lowering portion when the second supporting plate is in the second supporting position, such that the second supporting plate is reset to the second storage position when the first supporting plate is reset to the first storage position.

In one of the embodiments, the charging main body comprises a charging power supply connected to the bottom housing and a circuit board electrically connected to the charging power supply, and the first charging coil is electrically connected to the circuit board.

In one of the embodiments, the charging mechanism further comprises a second charging coil which is connected to the bottom housing and electrically connected to the circuit board, the second charging coil being capable of charging an electronic device which abuts against the bottom housing.

In one of the embodiments, the charging mechanism further comprises a socket connected to the circuit board.

Beneficial Effects of the Invention

Beneficial Effects

Compared with the prior art, the present application has the technical effects as follows. According to the charging base of the present application, when the electronic device needs to be supported and charged, the first supporting plate is rotated from the first storage position to the first supporting position, and the second supporting plate is rotated from the second storage position to the second supporting position. The electronic device can then be placed on the second supporting plate and abut against the first supporting plate, so that the charging main body can charge the electronic device by means of the first charging coil on the first supporting plate. Moreover, the second supporting plate can limit the displacement of the electronic device that abuts against the first supporting plate, so as to prevent the electronic device from deviating from the charging position on the first supporting plate. When the charging base is not in use, the first supporting plate can be rotated from the first supporting position to the first storage position, and the level of the extension portion is then lowered, so that the space occupied by the charging base is reduced and the charging base is convenient to carry and store.

BRIEF DESCRIPTION OF THE DRAWINGS

In order to explain the technical solutions of the embodiments of the present application more clearly, the drawings used in the embodiments of the present application or the description of the prior art will be briefly introduced below. Obviously, the drawings described below are only some embodiments of the present application, and for those of ordinary skill in the art, other drawings can be obtained based on these drawings without involving any inventive effort.

Figure 1:
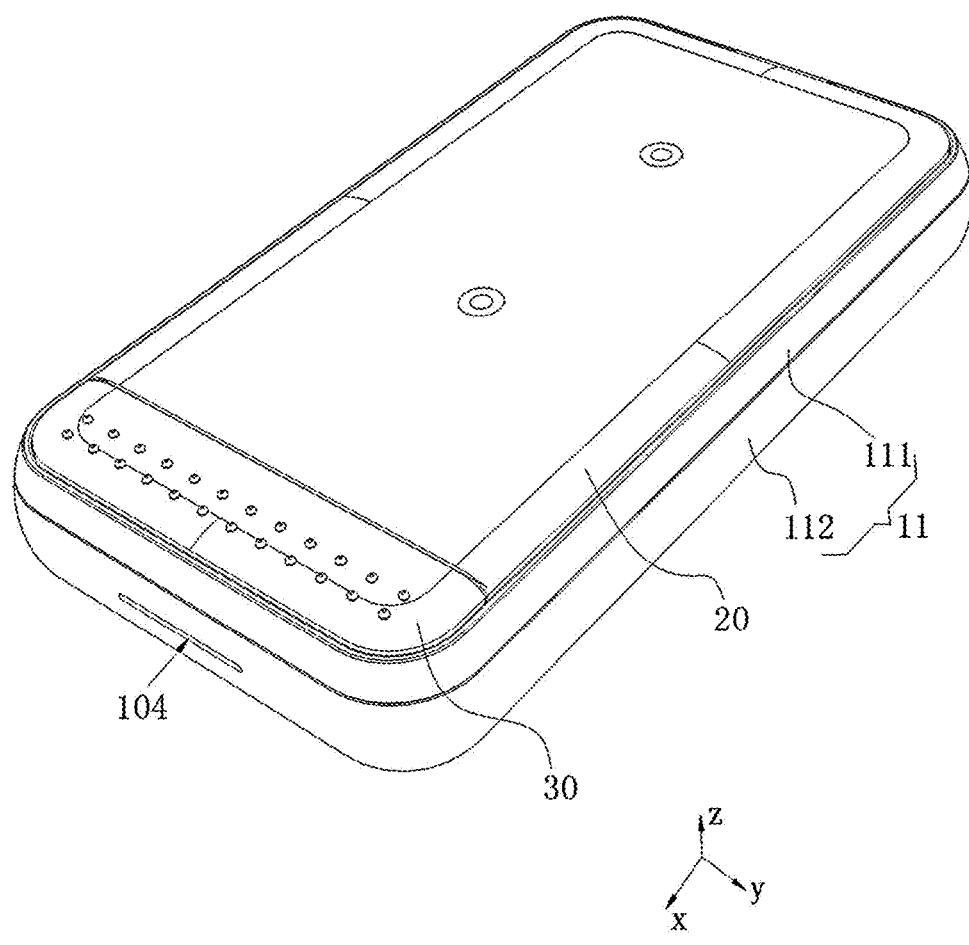
Figure 2:
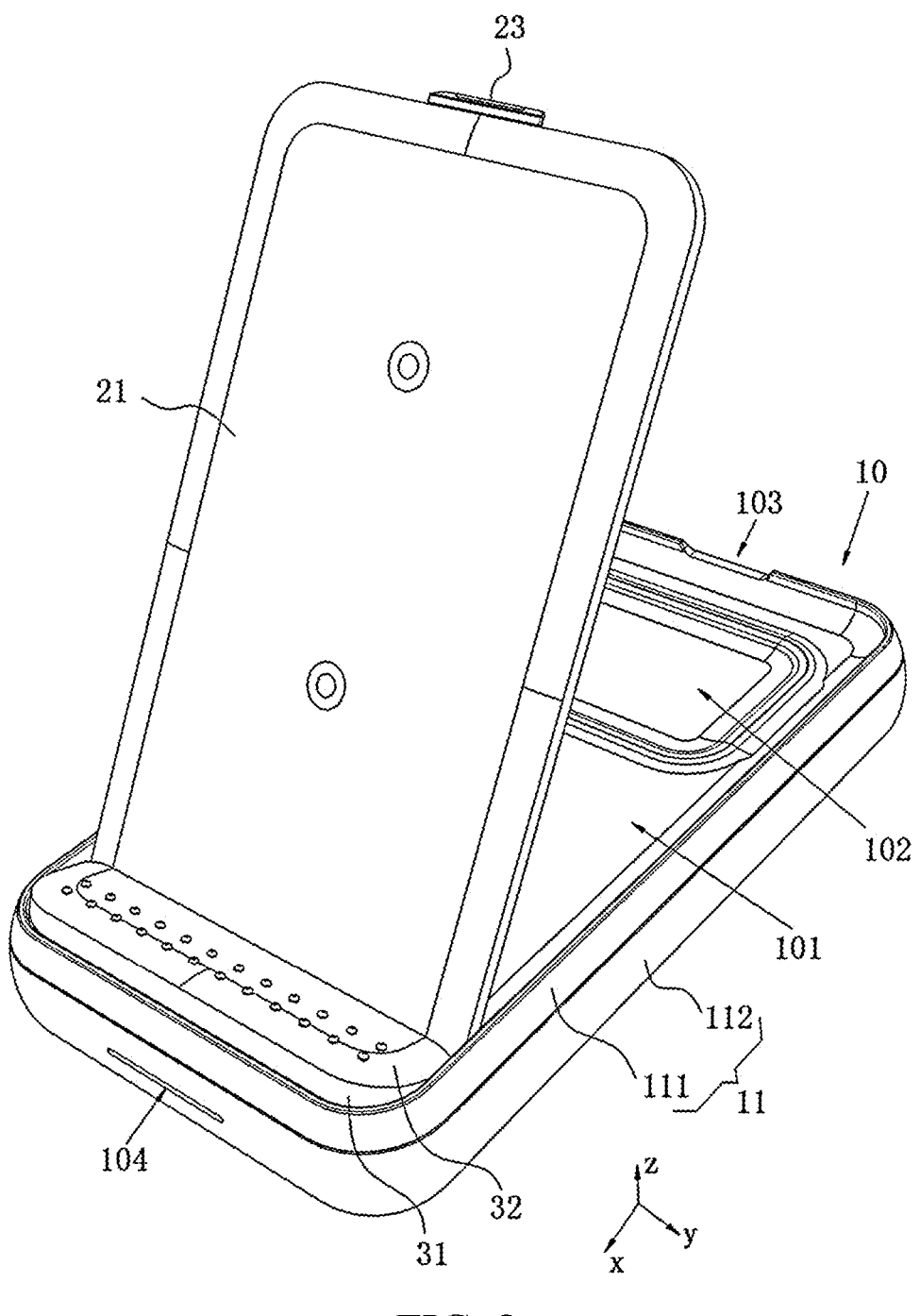
Figure 3:
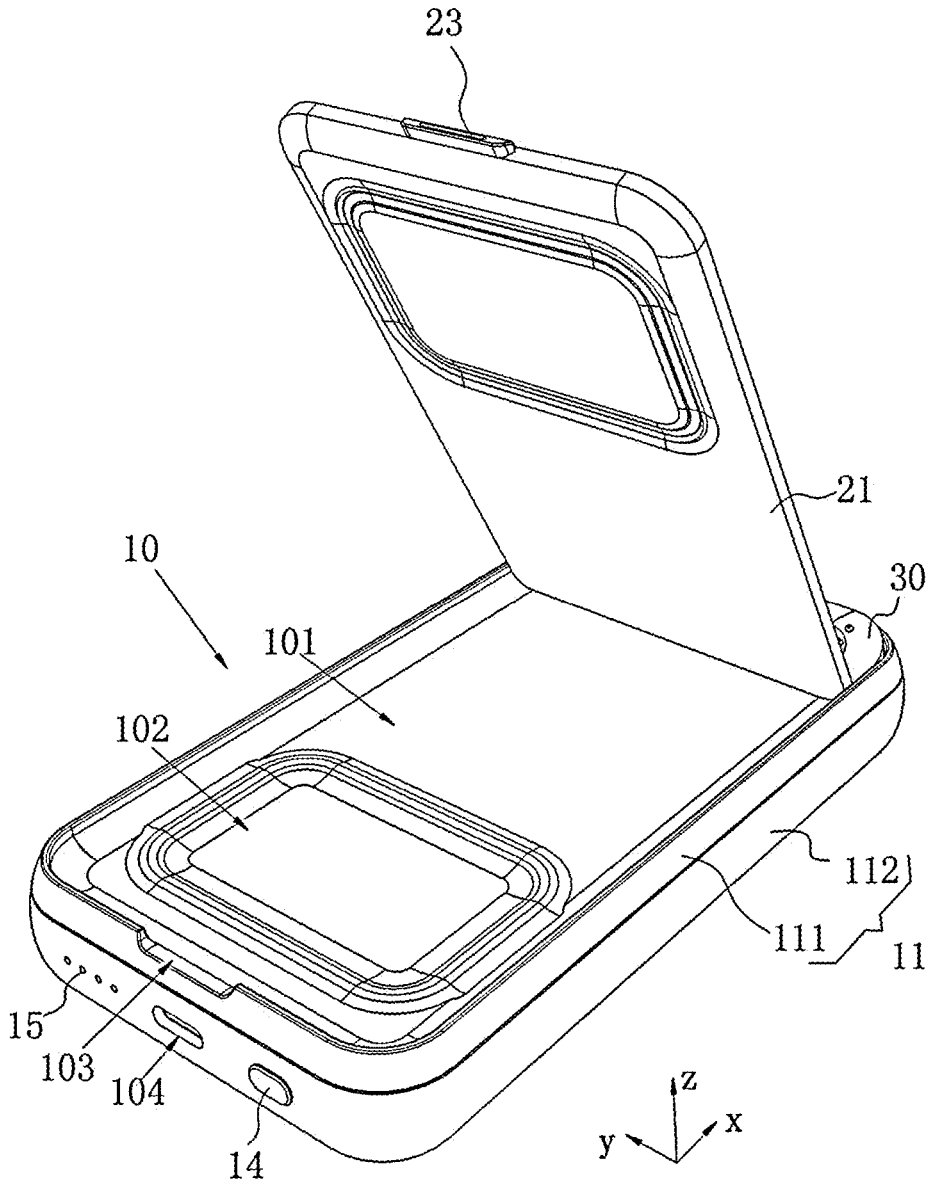
Figure 4:
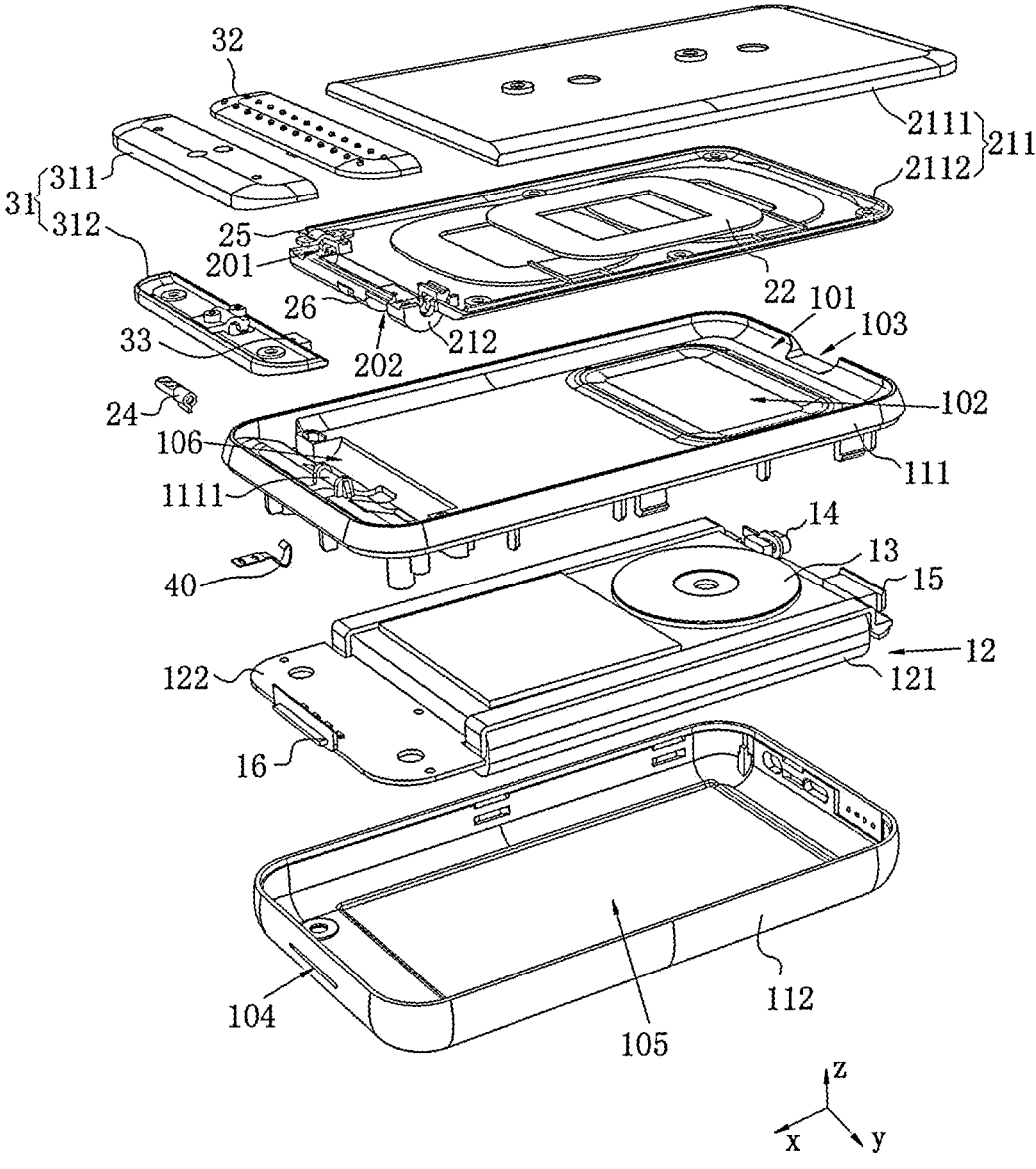

FIG. 1 is a perspective structural view of a charging base according to an embodiment of the present application, with a first supporting plate in a first storage position and a second supporting plate in a second storage position;

FIG. 2 is a perspective structural view of a charging base according to an embodiment of the present application from a perspective angle, with a first supporting plate in a first supporting position and a second supporting plate in a second supporting position;

FIG. 3 is a perspective structural view of the charging base according to an embodiment of the present application from another perspective angle, with a first supporting plate in a first supporting position and a second supporting plate in a second supporting position;

FIG. 4 is an exploded view of the charging base in FIG. 1; and

Figure 5:
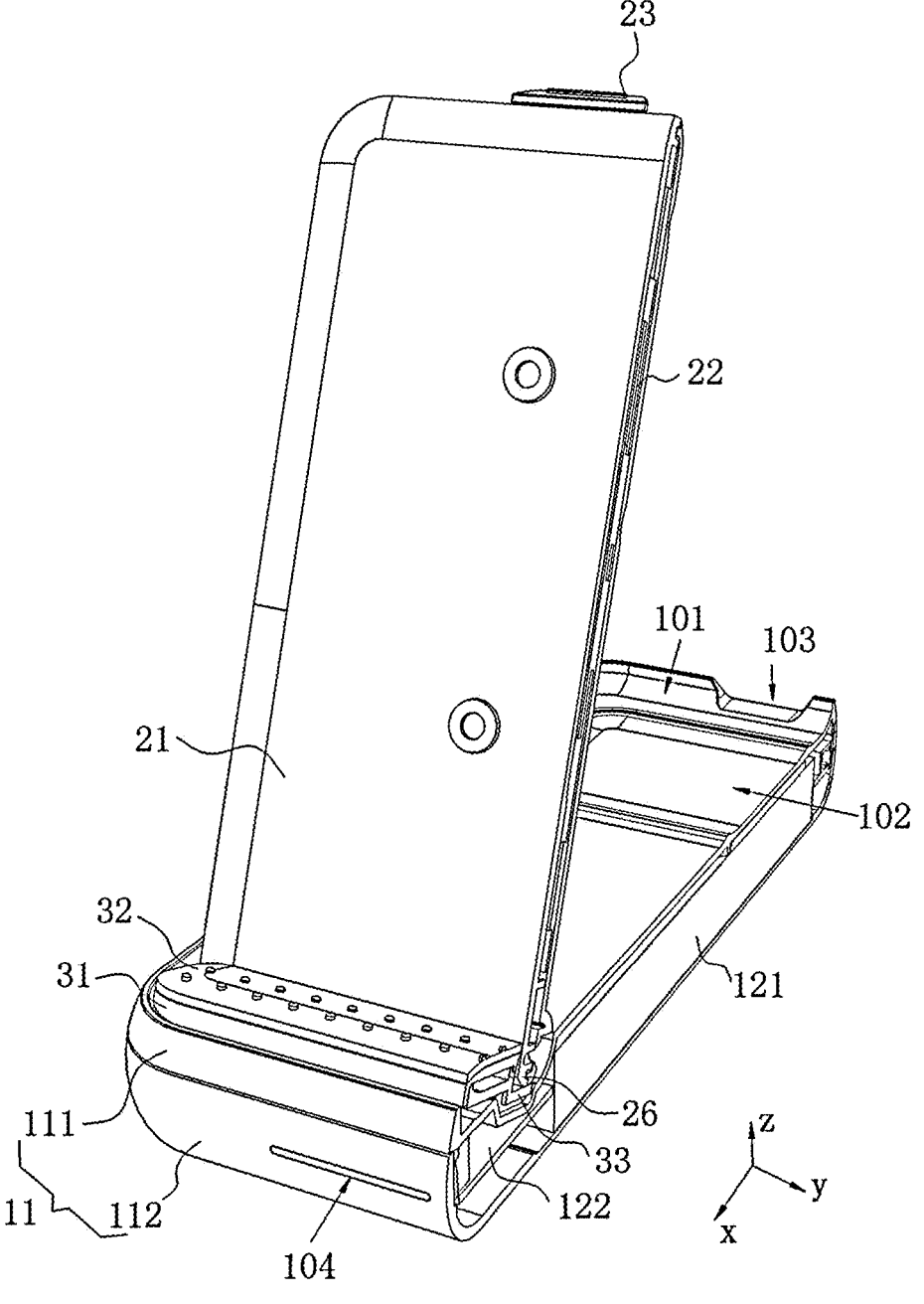
Figure 6:
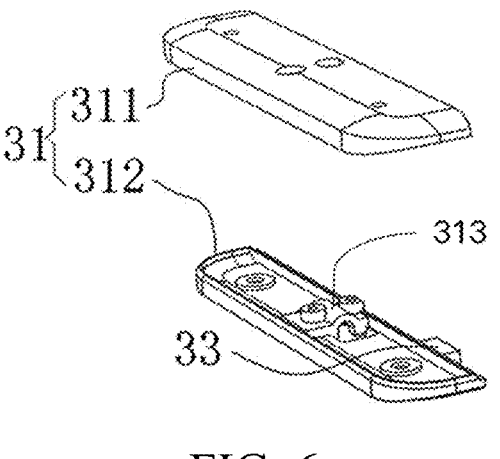

FIG. 5 is a sectional view of the charging base in FIG. 2;

FIG. 6 is a partially enlarged view of a second support plate including a raising portion, a lowering portion, and a connecting portion.

LIST OF REFERENCE NUMERALS

10. Charging mechanism; 101. Receiving recess; 102. Positioning recess; 103. Depression; 104. Socket hole; 105. Accommodating cavity; 106. Arc-shaped abutment surface; 11. Bottom housing; 111. Upper housing body; 1111. Pivot shaft; 112. Lower housing body; 12. Charging main body; 121. Charging power supply; 122. Circuit board; 13. Second charging coil; 14. Button; 15. Indicator light; 16. Socket; 20. First supporting mechanism; 201. Limiting groove; 202. Avoidance groove; 21. First supporting plate; 211. Extension portion; 2111. First cover plate; 2112. First bottom plate; 212. Rotation portion; 22. First charging oil; 23. Protrusion; 24. Damping shaft; 25. First limiting member; 26. Force applying member; 30. Second supporting mechanism; 31. Second supporting plate; 311. Second cover plate; 312. Second bottom plate; 313. connecting portion; 32. Anti-slip structure; 33. Protruding post; and 40. Reset mechanism.

EMBODIMENTS OF THE INVENTION

Implementations of the Invention

Embodiments of the present application will be described below in detail, and examples of the embodiments are shown in the drawings, wherein the same or similar reference numerals represent the same or similar elements or elements having the same or similar functions throughout. The embodiments described below with reference to the accompanying drawings are exemplary and are intended to be illustrative of the present application, and will not be interpreted as limiting the present application.

In the description of the present application, it should be understood that the orientations or positional relationships indicated by the terms "length", "width", "up", "down", "vertical", "horizontal", "top", "bottom", "inside", "outside", etc. are based on the orientations or positional relationships shown in the drawings, and are only for the convenience of describing the present application and simplifying the description, rather than indicating or implying that an apparatus or element referred to must have a specific orientation or be constructed and operated in a specific orientation, and therefore cannot be construed as limiting the present application.

In the embodiments, according to an XYZ rectangular coordinate system established in FIGS. 1 to 5, the following definitions are made: the side located in a positive direction of an X-axis is defined as front, and the side located in a negative direction of the X-axis is defined as rear; the side in a positive direction of a Y-axis is defined as left, and the side in a negative direction of the Y-axis is defined as right; and the side in a positive direction of a Z-axis is defined as up, and the side in a negative direction of the Z-axis is defined as down.

In addition, the terms "first" and "second" are used for descriptive purposes only, and cannot be construed as indicating or implying relative importance or implicitly indicating the number of technical features indicated. Thus, the features defined by "first" and "second" can explicitly or implicitly include one or more of the features. In the description of the present application, the meaning of "a plurality of" is two or more, unless otherwise explicitly and specifically defined.

In the present application, unless expressly stated or limited otherwise, the terms such as "mounting", "connection", "connected" and "fixing" should be interpreted broadly, for example, either fixed or detachable connection, or integration; or may be a mechanical connection or an electrical connection; or may be a direct connection, an indirect connection through an intermediate medium, or communication between the interiors of two elements or interaction between two elements. For those of ordinary skill in the art, the specific meanings of the above terms in the present application can be understood according to specific situations.

In order to make the objective, technical solutions, and advantages of the present application clearer, the present application is described in further detail below with reference to the drawings and embodiments.

The present application provides a charging base for charging an electronic device. The electronic device may be a mobile phone, a tablet computer, an earphone charging case, a smart watch, or the like.

Referring to FIGS. 1 and 4, the charging base comprises a charging mechanism 10, a first supporting mechanism 20, a second supporting mechanism 30, and a reset mechanism 40.

Referring to FIGS. 1 and 4, the charging mechanism 10 comprises a bottom housing 11 and a charging main body 12 which is connected to the bottom housing 11 and configured to supply power. The bottom housing 11 has a square cross section. In other embodiments, the bottom housing 11 has other regular or irregular shaped cross sections. The charging main body 12 may be a plug connector or a connecting cable configured to be connected to an external power supply. In this embodiment, the bottom housing 11 comprises an upper housing body 111 and a lower housing body 112 joined with the upper housing body 111, and the upper housing body 111 and the lower housing body 112 together enclose an accommodating cavity 105. The charging main body 12 comprises a charging power supply 121 which is connected to the bottom housing 11 and configured to supply power, and a circuit board 122 which is electrically connected to the charging power supply 121. The charging power supply 121 and the circuit board 122 are both located in the accommodating cavity 105. The upper housing body 111 is provided with a receiving recess 101. Preferably, further referring to FIG. 2, the bottom housing 11 is provided with a button 14 and an indicator light 15 which is electrically connected to the circuit board 122. When a user presses the button 14, the indicator light 15 can display the current remaining power level of the charging power supply 121, which brings convenience for the user to observe and charge. In other embodiments, the base may be further provided with a display screen. The display screen may be configured to display the power level or other data.

Referring to FIGS. 1 and 2, the first supporting mechanism 20 is configured to support an electronic device. The first supporting mechanism 20 comprises a first supporting plate 21 and a first charging coil 22 which is arranged on the first supporting plate 21 and electrically connected to the charging main body 12. Further referring to FIGS. 4 and 5, the first charging coil 22 is electrically connected to the circuit board 122 and can wirelessly charge, through the charging power supply 121, the electronic device which abuts against the first supporting plate 21. The first supporting plate 21 comprises a rotation portion 212 and an extension portion 211 connected to the rotation portion 212. The rotation portion 212 is rotatably connected to the bottom housing 11, the first supporting plate 21 is rotatable between a first storage position and a first supporting position, and a level of the extension portion 211 when the first supporting plate 21 is in the first supporting position is higher than that of the extension portion 211 when the first supporting plate 21 is in the first storage position. In this embodiment, taking the plane where the bottom of the receiving recess 101 is located as a horizontal plane, that the level of the extension portion 211 when the first supporting plate 21 is in the first supporting position is higher than that of the extension portion 211 when the first supporting plate 21 is in the first storage position may be understood as that a distance between the extension portion 211 and the bottom of the receiving recess 101 when the first supporting plate 21 is in the first supporting position is greater than the distance between the extension portion 211 and the bottom of the receiving recess 101 when the first supporting plate 21 is in the first storage position. The extension portion 211 comprises a first cover plate 2111 and a first bottom plate 2112 joined with the first cover plate 2111. The first charging coil 22 is located between the first cover plate 2111 and the first bottom plate 2112. Further referring to FIG. 3, the first supporting plate 21 is provided with a protrusion 23 at an edge thereof, and the upper housing body 111 is further provided with a depression 103 which is in communication with the receiving recess 101. When the first supporting plate 21 is in the first storage position, the protrusion 23 is received in the depression 103. The protrusion 23 is configured for the user to rotate the first supporting plate 21 by hand.

Referring to FIG. 1, preferably, when the first supporting plate 21 is in the first storage position, the level of the extension portion 211 is equal to that of the rotation portion 212. In this way, the first supporting plate 21 is parallel to the bottom of the receiving recess 101, so that the space occupied by the charging base is reduced. It can be understood that the first supporting plate 21 may be in the shape of a plate; and when the first supporting plate 21 is in the first storage position, the first supporting plate 21 may be received in the receiving recess 101 and abut against the bottom of the receiving recess 101. That is, the distance between the extension portion 211 and the bottom of the receiving recess 101 is zero.

A position on the first supporting plate 21 corresponding to the first charging coil 22 is a charging position. The electronic device can be placed flat in the charging position, and the charging main body 12 wirelessly charges the electronic device by means of the first charging coil 22. When the first supporting plate 21 is rotated from the first storage position to the first supporting position, the rotation angle is preferably less than 90°, such that the back of the electronic device leans against the first supporting plate 21. The first supporting plate 21 may be rotated by an external force, or controlled to rotate by internal mechanical power or electric power, and can stay at the current position when stopped rotating.

Referring to FIGS. 2 and 4, the second supporting mechanism 30 is configured to hold the electronic device and comprises a second supporting plate 31. The second supporting plate 31 is rotatably connected to the bottom housing 11 and rotatable between a second storage position and a second supporting position, and the second supporting plate 31 is capable of limiting a displacement of the electronic device that abuts against the first supporting plate 21 when the first supporting mechanism 20 is in the first supporting position and the second supporting mechanism 30 is in the second supporting position. The second supporting plate 31 comprises a second cover plate 311 and a second bottom plate 312 joined with the second cover 311.

Referring to FIG. 1, when the first supporting plate 21 is in the first storage position, the second supporting plate 31 is also in the second storage position, such that space occupation is avoided. Referring to FIGS. 2 and 3, when the first supporting plate 21 is in the first supporting position, the second supporting plate 31 may be in the second storage position, or in the second supporting position. In this embodiment, when being in the second storage position, the second supporting plate 31 is received in the receiving recess 101 and fits against the bottom of the receiving recess 101; and when being in the second supporting position, the second supporting plate preferably forms an included angle of 90 degrees with respect to the first supporting plate 21 that is in the first supporting position, thereby facilitating the adaption to the electronic device.

When the electronic device needs to be charged, an edge thereof may be placed on the second supporting plate 31 such that the back of the electronic device abuts against the first supporting plate 21. When an acute angle is formed between the first supporting plate 21 and a bottom surface of the receiving recess 101, the second supporting plate 31 is arranged obliquely to prevent the electronic device from slipping off the second supporting plate 31, and then the electronic device can stably abut against the first supporting plate 21 to avoid deviating from the charging position. Specifically, a rotation axis of the first supporting plate 21 is parallel to a rotation axis of the second supporting plate 31, and a rotation direction of the first supporting plate 21 from the first storage position to the first supporting position is opposite to a rotation direction of the second supporting plate 31 from the second storage position to the second supporting position.

In this embodiment, referring to FIGS. 2 and 3, when the first supporting plate 21 is in the first storage position and the second supporting mechanism 30 is in the second storage position, the first supporting mechanism 20 and the second supporting mechanism 30 are located on the same horizontal plane, so that the space occupied by the charging base when it is not in use is further reduced while the charging base is more attractive.

Referring to FIG. 2, preferably, the second supporting plate 31 is provided with an anti-slip structure 32 for increasing a friction force between the electronic device and the second supporting plate 31. The anti-slip structure 32 may be a rubber pad with a rough surface. More preferably, the anti-slip surface of the anti-slip structure 32 is an inwardly-recessed arc-shaped surface.

According to the charging base of the present application, when the electronic device needs to be supported and charged, the first supporting plate 21 is rotated from the first storage position to the first supporting position, and the second supporting plate 31 is rotated from the second storage position to the second supporting position. The electronic device can then be placed on the second supporting plate 31 and abut against the first supporting plate 21, so that the charging main body 12 can charge the electronic device by means of the first charging coil 22 on the first supporting plate 21. Moreover, the second supporting plate 31 can limit the displacement of the electronic device that abuts against the first supporting plate 21, so as to prevent the electronic device from deviating from the charging position on the first supporting plate 21. When the charging base is not in use, the first supporting plate 21 can be rotated from the first supporting position to the first storage position, and the level of the extension portion 211 is then lowered, so that the space occupied by the charging base is reduced and the charging base is convenient to carry and store.

Referring to FIG. 4, in order to realize a rotational connection between the first supporting plate 21 and the bottom housing 11, the first supporting mechanism 20 further comprises a damping shaft 24 connected to the bottom housing 11. Specifically, the damping shaft 24 is connected to a wall of a storage groove, the rotation portion 212 is rotatably connected to the damping shaft 24 and capable of being limited by a damping force between itself and the damping shaft 24, and a central axis of the damping shaft 24 is parallel to a rotation axis of the second supporting plate 31. In this way, the first supporting plate 21 can stay at any position during rotation by the damping force. When the first supporting plate 21 is rotated to the first supporting position and no external force acts thereon, it can stay at the supporting position. The damping force is greater than a pressure of the electronic device on the first supporting plate 21 when abutting against the first supporting plate 21. One damping shaft 24 may be provided. In other embodiments, two damping shafts 24 may be provided to increase the damping force.

Referring to FIG. 4, an arc-shaped abutment surface 106 is provided on the side of the lower housing body 112 facing the upper housing body 111, a central axis corresponding to the arc-shaped abutment surface 106 coincides with the central axis of the damping shaft 24, and the rotation portion 212 is adapted to the arc-shaped abutment surface 106 and abuts against the arc-shaped abutment surface 106. Specifically, the upper housing body 111 is provided with a connecting groove (not shown) at the bottom of its storage groove. A wall of the connecting groove is provided with the arc-shaped abutment surface 106. The rotation portion 212 is cylindrical and its cross section is roughly semicircular, that is, its circumferential side wall has an arc-shaped surface and a flat surface. The arc-shaped surface of the rotation portion 212 fits against the arc-shaped abutment surface 106. The arc-shaped abutment surface 106 plays a role in guiding and limiting the rotation portion 212, increasing a supporting force to the first supporting plate 21, and reducing the influence of an external force on the damping shaft 24 during rotation.

Referring to FIG. 4, the rotation portion 212 is provided with a limiting groove 201 adapted to the damping shaft 24, the first supporting mechanism 20 further comprises a first limiting member 25 connected to the rotation portion 212, the first limiting member 25 and a wall of the limiting groove 201 together enclose a first rotation space, and the damping shaft 24 passes through the first rotation space. The first rotation space is adapted to the damping shaft 24. In this way, the wall of the limiting groove 201 and the first limiting member 25 circumferentially limit the damping shaft 24, so as to prevent the first supporting plate 21 from being separated from the damping shaft 24. In other embodiments, no first limiting member 25 may be provided, and the rotation portion 212 is located between the damping shaft 24 and the arc-shaped abutment surface 106. The first limiting member 25 may be detachably connected to the rotation portion 212 via a screw, facilitating assembly and disassembly.

Referring to FIG. 4, the bottom housing 11 is provided with a pivot shaft 1111. Preferably, the pivot shaft 1111 protrudes from the upper housing body 111, and a rotation axis of the pivot shaft 1111 is parallel to the rotation axis of the damping shaft 24. The second supporting plate 31 is provided with a fixing groove (not shown). The fixing groove has a semicircular cross section and is adapted to the pivot shaft 1111. In order to prevent the second supporting plate 31 from being separated from the pivot shaft 1111, the second supporting mechanism 30 further comprises a second limiting member connected to the second supporting plate 31. The second supporting plate 31 and the second limiting member together enclose a second rotation space. The pivot shaft 1111 passes through the second rotation space, so that the second supporting plate 31 is rotated relative to the pivot shaft 1111. The second rotation space is adapted to the pivot shaft 1111. In this way, a wall of the fixing groove and the second limiting member can circumferentially limit the pivot shaft 1111. In other embodiments, no fixing groove may be provided. The second limiting member may be detachably connected to the second supporting plate 31 via a screw, facilitating assembly and disassembly.

Optionally, the pivot shaft 1111 may be connected to the end of the second supporting plate 31 facing the first supporting plate 21, or may be connected to the end of the second supporting plate 31 facing away from the first supporting plate 21. In this embodiment, the second supporting plate 31 comprises a raising portion, a lowering portion, and a connecting portion 313 connected between the raising portion and the lowering portion, as shown in FIG. 6. In this embodiment, the raising portion refers to the second cover plate 311, and the lowering portion refers to the second bottom plate 312. The raising portion, the connecting portion 313 and the lowering portion are sequentially connected to one another form a plate shape. The connecting portion 313 is rotatably connected to the bottom housing 11. A level of the raising portion is equal to that of the lowering portion when the second supporting plate 31 is in the second storage position; and the level of the raising portion is higher than that of the lowering portion when the second supporting plate 31 is in the second supporting position. In this way, compared with the way of connecting the pivot shaft 1111 to one end of the second supporting plate 31, the way of connecting the pivot shaft 1111 to the connecting portion 313 can make the radius of rotation of the second supporting plate 31 smaller, so that the rotation space of the second supporting plate 31 during rotation is smaller, and the space occupied thereby is also reduced.

Referring to FIGS. 4 and 5, the rotation of the second supporting plate 31 may be realized by an external force, or by electric power or an internal mechanical structure. In this embodiment, the second supporting plate 31 is driven to rotate by the first supporting plate 21. The second supporting mechanism 30 further comprises a protruding post 33 which protrudes from the lowering portion, the first supporting mechanism 20 further comprises a force applying member 26 protruding from and connected to the rotation portion 212, and the force applying member 26 is capable of pushing the protruding post 33 such that the second limiting plate is rotated from the second storage position to the second supporting position as the first supporting plate 21 is rotated from the first storage position to the first supporting position. Specifically, as the first supporting plate 21 is rotated from the first storage position to the first supporting position, the force applying member 26 always abuts against the protruding post 33 and can drive the second supporting plate 31 to rotate synchronously. In this way, when the user rotates the first supporting plate 21, the second supporting plate 31 can be rotated synchronously, reducing the number of operation steps. Moreover, the force applying member 26 can prevent the second supporting plate 31 from resetting to the second storage position, and thus plays a role in limiting. Preferably, an avoidance groove 202 for avoiding the protruding post 33 is defined on the rotation portion 212 of the first supporting plate 21, and the force applying member 26 is connected to a wall of the avoidance groove 202.

Referring to FIG. 4, a reset mechanism 40 is connected to the bottom housing 11, and the reset mechanism 40 is capable of applying an elastic force to the second supporting plate 31 when the second supporting plate 31 is in the second supporting position, such that the second supporting plate 31 is reset to the second storage position when the first supporting plate 21 is reset to the first storage position. That is, when the first supporting plate 21 is in the first supporting position, the damping force on the first supporting plate 21 is higher than the elastic force of the reset mechanism 40, so that the first supporting plate 21 stays at the first supporting position, and the second supporting plate 31 stays at the second supporting position; and when a first reset member is rotated from the first supporting position to the first storage position, the reset mechanism 40 drives a second supporting member to rotate from the second supporting position to the second storage position through the elastic force. In this way, the automatic reset of the second supporting plate 31 is realized, and the step of manual reset is omitted, facilitating the operation.

In this embodiment, the reset mechanism 40 is an elastic piece which abuts against the second supporting plate 31 and has elasticity. Specifically, the lowering portion abuts against the reset mechanism 40, and the reset mechanism 40 is capable of applying an upward elastic force to the lowering portion when the second supporting plate 31 is in the second supporting position, such that the second supporting plate 31 is reset to the second supporting position. That is, when the second supporting plate 31 is in the second supporting position, the lowering portion is rotated downwardly, the reset mechanism 40 is located below the lowering portion and is compressed and exerts an upward elastic force on the lowering portion; and when the first supporting plate 21 is rotated toward the first storage position, the lowering portion is rotated upwardly under the action of the elastic force until the second supporting plate 31 is reset to the second storage position.

Referring to FIG. 4, in order to charge multiple devices with the charging base, the charging mechanism 10 further comprises a second charging coil 13 which is connected to the bottom housing 11 and electrically connected to a circuit board 122. The second charging coil 13 is capable of charging an electronic device which abuts against the bottom housing 11. Specifically, the upper housing body 111 has a charging area corresponding to the second charging coil 13. When the first supporting plate 21 is in the first supporting position, another electronic device can be placed in the charging area of the upper housing body 111, so that the first charging coil 22 and the second charging coil 13 can simultaneously charge the two electronic devices. A mobile phone may be wirelessly charged by means of the first charging coil 22, and an earphone charging case may be charged by means of the second charging coil 13. Referring to FIGS. 2 and 3, preferably, the second charging area is provided with a positioning recess 102 adapted to the earphone charging case. The positioning recess 102 is configured to limit a displacement of the earphone charging case.

Referring to FIGS. 3 and 4, further, the charging mechanism 10 further comprises a socket 16 connected to the circuit board 122. The bottom housing 11 is provided with a socket hole 104 corresponding to the socket 16. The socket 16 may be electrically connected to a further electronic device via an external plug, thereby realizing wired charging of the further electronic device. The charging power supply 121 may also store electricity by connecting the socket 16 to an external power supply. One or more sockets 16 may be provided, which may be a USB-Type-C socket 16, a USB-Type-B socket 16, an audio interface socket, an HDMI interface socket, or the like.

The above embodiments are merely preferred embodiments of the present application, only the technical principles of the present application are specifically described, and these descriptions are only for explaining the principles of the present application and cannot be interpreted in any way as limiting the scope of protection of the present application. Based on the explanation herein, any modifications, equivalent replacements, and improvements made within the spirit and principles of the present application, and other specific implementations of the present application conceived by those skilled in the art without involving any inventive effort should be included within the scope of protection of the present application.

What is claimed is:

1. A charging base for charging an electronic device, comprising:

a charging mechanism, comprising a bottom housing and a charging main body which is connected to the bottom housing and configured to supply power;

a first supporting mechanism, comprising a first supporting plate which is rotatably connected to the bottom housing and configured to allow the electronic device to abut against, and a first charging coil which is arranged on the first supporting plate and electrically connected to the charging main body, wherein the first charging coil is capable of wirelessly charging the electronic device that abuts against the first supporting plate, the first supporting plate comprises a rotation portion and an extension portion connected to the rotation portion, the rotation portion is rotatably connected to the bottom housing, the first supporting plate is rotatable between a first storage position and a first supporting position, and a level of the extension portion when the first supporting plate is in the first supporting position is higher than that of the extension portion when the first supporting plate is in the first storage position; and a second supporting mechanism, comprising a second supporting plate configured to hold the electronic device, wherein the second supporting plate is rotatably connected to the bottom housing and is rotatable between a second storage position and a second supporting position, and the second supporting plate is capable of limiting a displacement of the electronic device that abuts against the first supporting plate when the first supporting mechanism is in the first supporting position and the second supporting mechanism is in the second supporting position, wherein the second supporting plate comprises a raising portion, a lowering portion, and a connecting portion connected between the raising portion and the lowering portion, the connecting portion is rotatably connected to the bottom housing, and a level of the raising portion is higher than that of the lowering portion when the second supporting plate is in the second supporting position.

2. The charging base of claim 1, wherein the first supporting mechanism further comprises a damping shaft connected to the bottom housing, the rotation portion is rotatably connected to the damping shaft and capable of being limited by a damping force between itself and the damping shaft, and a central axis of the damping shaft is parallel to a rotation axis of the second supporting plate.

3. The charging base of claim 2, wherein the bottom housing comprises an upper housing body and a lower housing body joined with the upper housing body, an arc-shaped abutment surface is provided on the side of the upper housing body facing away from the lower housing body, a central axis corresponding to the arc-shaped abutment surface coincides with the central axis of the damping shaft, and the rotation portion is adapted to the arc-shaped abutment surface and abuts against the arc-shaped abutment surface.

4. The charging base of claim 2, wherein the rotation portion is provided with a limiting groove adapted to the damping shaft, the first supporting mechanism further comprises a first limiting member connected to the rotation portion, the first limiting member and a wall of the limiting groove together enclose a first rotation space, and the damping shaft passes through the first rotation space.

5. The charging base of claim 1, wherein the bottom housing is provided with a pivot shaft, the second supporting mechanism further comprises a second limiting member connected to the second supporting plate, the second supporting plate and the second limiting member together enclose a second rotation space, and the pivot shaft passes through the second rotation space, so that the second supporting plate is rotated relative to the pivot shaft.

6. The charging base of claim 1, wherein the level of the extension portion is higher than that of the rotation portion when the first supporting plate is in the first storage position.

7. The charging base of claim 1, wherein the level of the raising portion is equal to that of the lowering portion when the second supporting plate is in the second storage position.

8. The charging base of claim 1, wherein when the first supporting plate is in the first storage position and the second supporting mechanism is in the second storage position, the first supporting mechanism and the second supporting mechanism are located on the same horizontal plane.

9. The charging base of claim 1, wherein the second supporting mechanism further comprises a protruding post which protrudes from the lowering portion, and the first supporting mechanism further comprises a force applying member connected to the rotation portion, the force applying member being capable of pushing the protruding post such that the second supporting plate is rotated from the second storage position to the second supporting position as the first supporting plate is rotated from the first storage position to the first supporting position.

10. The charging base of claim 1, further comprising a reset mechanism connected to the bottom housing, which reset mechanism is capable of applying an elastic force to the second supporting plate when the second supporting plate is in the second supporting position, such that the second supporting plate is reset to the second storage position.

11. The charging base of claim 10, wherein the reset mechanism is elastic, the lowering portion abuts against the reset mechanism, and the reset mechanism is capable of applying an upward elastic force to the lowering portion when the second supporting plate is in the second supporting position, such that the second supporting plate is reset to the second storage position when the first supporting plate is reset to the first storage position.

12. The charging base of claim 1, wherein the charging main body comprises a charging power supply connected to the bottom housing and a circuit board electrically connected to the charging power supply, and the first charging coil is electrically connected to the circuit board.

13. The charging base of claim 12, wherein the charging mechanism further comprises a second charging coil which is connected to the bottom housing and electrically connected to the circuit board, the second charging coil being capable of charging an electronic device which abuts against the bottom housing.

14. The charging base of claim 1, wherein the charging mechanism further comprises a socket connected to the circuit board.

* * * * *